Nov. 7, 1939.                 U. G. ROGERS                    2,179,274
                              WATER HEATER
                           Filed Oct. 28, 1938        2 Sheets-Sheet 1
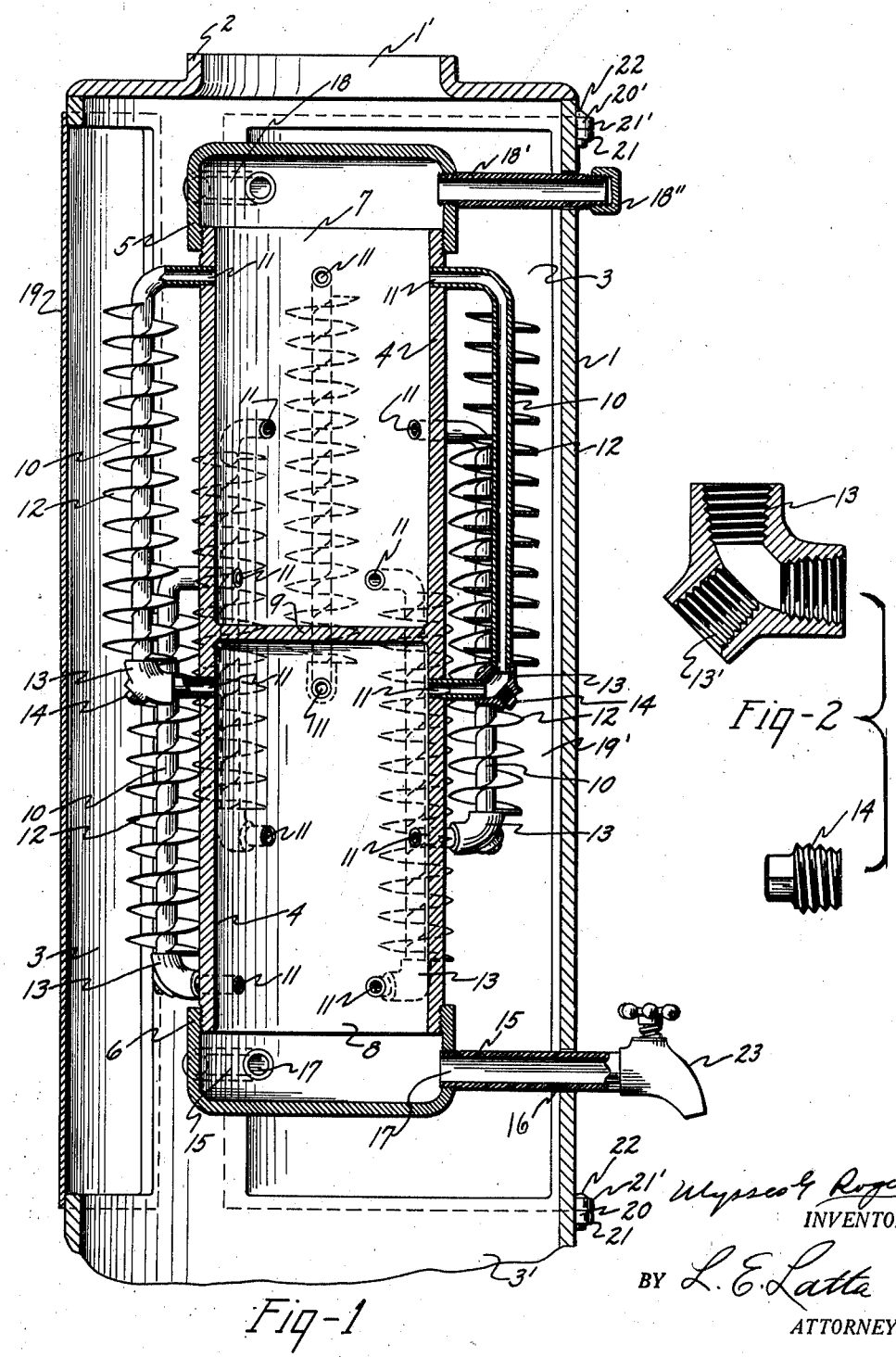

Nov. 7, 1939.     U. G. ROGERS     2,179,274
WATER HEATER
Filed Oct. 28, 1938     2 Sheets-Sheet 2
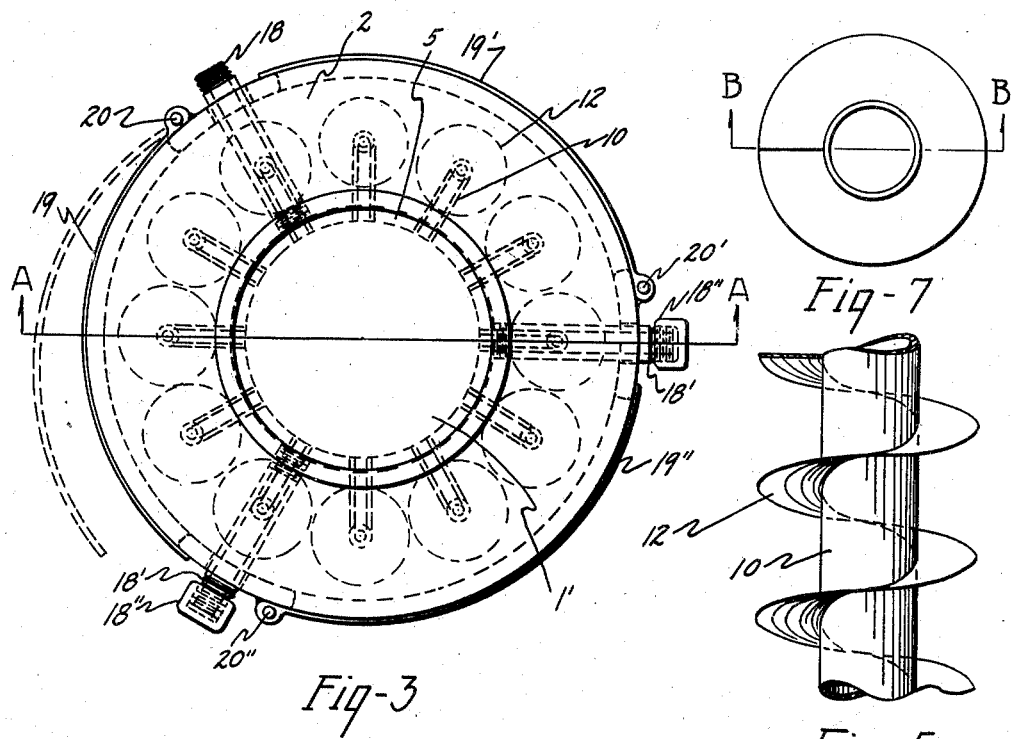
Fig-3
Fig-7
Fig-5
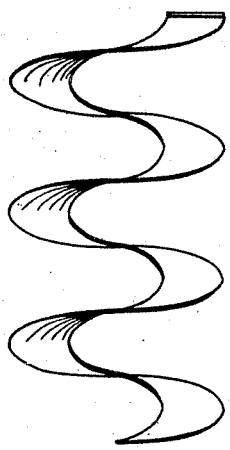
Fig-4
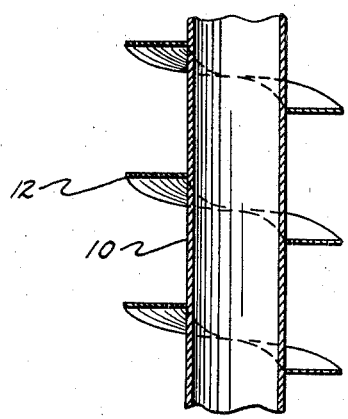
Fig-6
Ulysses G. Rogers
INVENTOR.
BY L. E. Latta
ATTORNEYS.

UNITED STATES PATENT OFFICE 2,179,274

WATER HEATER

Ulysses G. Rogers, Jackson, Mich., assignor of one-half to John J. Gallagher

Application October 28, 1938, Serial No. 237,516

3 Claims. (Cl. 122—245)

My invention relates to improvements in tubulous water heaters, the primary object thereof being to provide a mechanism for heating water for domestic and other uses, whereby economical, convenient and ready supply thereof may be more quickly obtained, heated to any desired degree greater than ordinary water temperature.

A further object of my invention is to attain greater economy of cost in the heating of water by increasing the efficiency of the processes and means of imparting heat units thereto. I effect this economy by four means. First, by reducing the time required to raise the temperature of a given volume of water to a given degree. Through the use of my improved device, by thus reducing the time of operation, I greatly reduce that loss of heat units which, in any case, always escape through the combustion chamber and flue, and by radiation from the mechanism, during the heating period, without being absorbed by the water. Second, in breaking up the volume of water into numerous small streams as it passes through the heater, diverting the same through a plurality of small conduits, thus bringing a much larger area of water surface into direct contact with the heated walls of the containers and at the same time reducing the volume of cool water in the cores of the respective streams, uncontacted with the said heated walls. Third, by stirring up and mixing all portions of the heated gases while in the course of passing through the combustion chamber, thereby increasing to a greater degree the direct contacting of all the hotter gases with the outer walls of the water conduits, thus causing absorption by the walls of the conduits and thence by the water, of a greater percentage of the heat units of the combustion gases. Metals collect and transmit heat more readily than water, and when the water content of the heater is divided up and passed through a plurality of conduits of small diameter, the area of metal surface exposed to contact with the circulating water is greatly increased over that so exposed when the same volume of water, in the same period of time, is passed through a single large conduit, and thus the water is more quickly heated under the former condition than under the latter.

Thus, I provide means by which heat units may be much more quickly and completely withdrawn and collected from the entire volume of heated combustion gases by a process of continuous stirring and mixing of the gases so as to bring all particles thereof into direct contact with the metal walls of the water conduits and other containers.

Fourth, by the combination of small water conduits, and longitudinally mounted thereon, closely contacting, metal, spiral fins, throughout the length thereof, the heated combustion gases thus being led by a circuitous route many times around the walls of the conduits, thereby multiplying the distance of their travel and the time of their passage through the heater.

To illustrate more definitely the object of my invention, I here state that with my improved heater I have heated to steaming temperature, the full contents of a water storage tank of thirty gallons capacity in fifteen minutes while, with the same burner and gas pressure, it required sixty minutes to heat an equal volume of water in a similar tank by passing the water in a single stream through a large conduit, all conditions otherwise being equal in the respective tests. The net result of the tests being a saving of seventy-five per cent in fuel consumption and forty-five minutes of time and wasting of heat units through flue escapement, by the use of my device.

Another object of my invention is to reduce the area of floor space required by my water heater as compared with that required by other water heaters of equal capacity.

A further object of my invention is to provide easier access and means for repairs and for removal of scale and sediment from interior and outside surfaces of water conduits and other heat absorbing surfaces. Any degree of success in this particular will prove of material benefit and improvement to the art, in providing better and more efficient service, greater economy in fuel consumption and longer life of the mechanism.

I attain, by means of my improved heater, a given capacity of hot water at a greatly reduced cost of the mechanism, thus making possible its use in a larger field of purchasers.

The use and application of my invention may be extended into substantially every field of use and consumption of hot water.

The description and illustrations of my device, herein shown, apply more specifically to heaters designed for hot water supplies for sinks, lavatories, bath-tubs and hot water heating systems, but I do not intend to limit it, or the scope of my claims, to such uses, but to extend the same throughout all fields of uses for hot water, such as for hospitals, industries, restaurants, pre-heaters for steam plants and mechanisms, and storages of hot water.

Other objects and advantages of the invention will appear from the description.

I declare the following to be a clear and exact description of the embodiment of my invention here shown, such as will enable those who are skilled in the art to make the same, reference being here made to the drawings, which form a part of the specification.

In the accompanying drawings forming a part of this specification, and in which like numerals are employed to designate like parts throughout the same, Figure 1 is a vertical cross section taken through the line A—A in Fig. 3.

Figure 2 is an enlarged, vertical cross section of the connecting elbow and means of access to the water conduits for cleaning operations, disposed in the lower portions of the several conduits designated by the numerals 10.

Figure 3 is a top view of the device.

Figure 4 is a view of a short section of a removable spiral fin of the water conduits, designated by the numerals 12.

Figure 5 is a vertical, front view of a portion of a water conduit, 10, with the removable, spiral fin, Fig. 4, in place thereon.

Figure 6 is a vertical cross section of a portion of a water conduit, 10, taken on line B—B in Fig. 7.

Figure 7 is a top view of conduit, 10, with spiral fin, 12, in place.

In the drawings wherein, for the purpose of illustration, is shown a preferred embodiment of my invention, the respective numerals designate the parts, as follows:

1 designates the shell or outer casement of the device, the enclosed space therein constituting the combustion chamber.

Opening 1' in the top of the casement comprises an escape vent therein for the upward draft of the heated gases of the combustion chamber into the flue, 2.

3 is the combustion chamber, the lower portion of which, 3', accommodates any desired, conventional heating apparatus, e. g., a gas or oil burner.

As no claim of invention of the heat producing member is made, no illustration or description of the same is included.

The numeral 4 designates an inner shell or casement, enclosing a water column or chamber which is sealed at either end by cap members 5 and 6, and this chamber is divided into upper and lower compartments 7 and 8 by a diaphragm or baffle-plate 9.

The numerals 10 designate metal U shaped tubes or water conduits, having advent into the chambers 7 and 8, through apertures 11, the ends of these tubes being sealed in the apertures against water leakage, and being so disposed as to provide means of communication of the water content of the water column therethrough, between the lower and upper chambers.

While, for purposes of illustration, I here show the water tubes 10 as being cylindrical in shape, nevertheless, I do not limit my specification or claims to round tubes, but extend the same to the use of tubes of any desired shape, such as oval, square, hexagonal and such like.

Numerals 12 designate spiral, metal, heat-absorbing fins, with central, vertical bore, detachably mounted with a close contacting fit upon the water conduits 10. A detail of a portion of this member is shown in Fig. 4, while in Figs. 5 and 6 respectively, are shown a vertical view and a vertical cross section of portions thereof.

13 designates a special 90 degree L fitting in the lower portion of tubes 10, with an aperture 13' therein at the outward angle, threaded to receive a removable, threaded plug. The function of the elbow with removable plug is to provide means for flushing cleaning compounds out of the tubes, and the insertion therein of internal tube brushes and scrapers, designed to remove scale and sediment from the tubes. A cross section of a detail of this member, with the threaded plug 14 removed and adjacent thereto, is shown in Fig. 2.

A preferable method of mounting the water tubes 10 on the shell or casement 4 of the water column or chambers, is to arrange the same in sets, concentrically around the same, as more clearly shown in Fig. 3, the first set mounted near the bottoms of the lower and upper chambers 7 and 8 respectively, as in Fig. 1, and each successive set of tubes mounted at a higher level than the preceding set. This permits a great number of tubes to be used without unduly weakening the strength of the shell 4 at any given place, by too close proximity of the apertures 11.

Numerals 15 are intake water supply pipes entering the shell 1 through apertures 16, extending to the lower cap member 6, entering the same through apertures 17, being sealed therein, and providing means for cold water supply to the heater from any general source of water supply.

18 and 18'—18' are the hot water service supply pipes to outlets or storage tank. Numeral 18 designates the supply pipe shown to be in use for drawing off hot water from the heater.

The hot water pipes 18' and 18' are shown as closed by caps, 18'' and 18'', see Fig. 3. When any of said pipes are not in use for delivery of hot water, the idle members may be capped as shown.

The three hot water discharge pipes and the cold water intake pipes 15, serve an additional purpose in suspending and supporting within the combustion chamber the water column shell and its appurtenant parts. The caps 18'' may be removed when it is desired to use additional discharge connections for conveying of the hot water.

The numerals 19, 19' and 19'' designate hinged doors, the door 19 being shown in partly open position by dotted lines in Fig. 3, while 19' and 19'' are shown as closed.

These doors swing on brackets 20, 20' and 20'', arranged in pairs, similar brackets being attached at convenient and corresponding points, near tops and bottoms respectively, of the attached sides of the doors. These brackets are each comprised of lugs, 21, attached to or integral with the outer shell 1, drilled with holes to receive connecting pins, and corresponding lugs, 21', attached to or integral with the swinging doors 19, 19', and 19'', likewise drilled with holes to receive the connecting pins, connecting pins, 22, to connect the lugs, said lugs 21 and 21' respectively, being disposed upon the shell and doors so to coordinate in a hingelike connection between the same. The utility of the hinged doors lies in their providing means of access to the internal members of the heater, for the making of repairs and replacements and for the cleaning of the parts.

The operation of this embodiment of my invention, as herein shown and described, is substantially as follows:

Water from any available source of supply is admitted into the heating mechanism through connections therefrom applied to the intake pipes 15, under gravity or other mechanically induced pressure.

The water level in the lower chamber 8 rises until the chamber is filled, and the water level in the pipes 10 likewise rises to a like level. The level in the chamber 8 is prevented from rising further by the partition 9, while continuing to rise in the tubes 10 until they discharge into the upper chamber 7, thus in turn filling the entire water containing members of the system and its connections to outside outlets, where it may be released to use by the opening of faucets or other release devices, which are not a part of the invention, and are not shown herein.

Any heating unit available and adapted to such a heater may be installed in the lower section of the combustion chamber as at 3'.

As the heated gases pass upward through the combustion chamber, they contact the surfaces of the outer walls of the inner shell 4, the cap members 5 and 6, water tubes 10, spiral fins 12 and pipes 15, 18, 18', and 18' and connecting fittings of the same. All these metal parts, whose surfaces are exposed to the heated gases, absorb heat and deliver the same to the water content thereof. It is obvious that the greater the area of such exposed metal surfaces, the greater will be the amount of heat collected, and in like manner, the greater the amount of the area of heated metal that is in turn exposed to the water, so will the heating of the water be accelerated.

For the purpose of increasing both the gas contacted area of the water container, and the area of contact between the water and the inner walls of the container, the body of water, as it passes through the device, is split up into small streams as it passes out of chamber 8, through tubes 10, and so undergoing a long travel through the heated gases in the combustion chamber and thence into chamber 7.

It will be observed that no loss of contact with heated surface occurs to the water by its being diverted through the small tubes, as it also eventually passes through all the other various compartments of the several water containing members before leaving the heater.

By this device, there is provided greatly increased surface area of exposed metal to the gases, and also to the water, and a very much greater proportion of the water actually contacts directly the heated metal, as compared with a situation where the same volume of water might be passed directly from inlet to outlet through chambers 8 and 7.

The spiral metal fins, 12, mounted on tubes 10, serve three important functions to further increase the efficiency of the heater. First, by still further increasing the metal surface exposed to the heat, which heat is communicated to the water through contact of the fins with the walls of the tubes, and thence to the water. Second, by the spiral path of travel for the gas, setting up of the same as it passes upward through the combustion chamber a whirling, stirring and mixing motion, thus removing the cooler gas from the walls of the tubes, causing hotter gas to take the place, and eventually to bring all hot gas into contact with the heat collecting members. Third, by setting up a spiral path of travel for the heated gas, around and around the tubes, greatly increasing the time of passage of the hot gases through the heater, as well as the time and distance of contact with the tubes and fins.

By this improvement, the water is quickly brought to high degrees of heat; steam is generated in the process, which tends to deposit scale and sediment in and upon the inner walls of the water containers and fixtures of the device. If long life, efficiency and good service are maintained, these deposits must be removed from time to time.

To facilitate ready access to the water containing and conveying members of the heater, I provide an outer shell or casement having three hinged doors as indicated by numerals 19, 19' and 19" in Fig. 3. Through these doors, all parts of the water column, tubes and pipes may be reached for repairs, replacements and cleaning. Compounds of any desired kind may be poured into the water compartments by removing cap 5, and same may be flushed out through drain cock 23 in intake pipe 15. For this purpose a shut-off valve may be installed in supply pipe from water supply source and closed while the drain cock is open.

Special elbow fittings 13, detailed in Fig. 2, are provided, with threaded apertures, and with threaded plugs, 14, to close the apertures. The plugs are removable, as shown in Fig. 2, to permit inserting of a tube-scraper or scrubber to aid in removing deleterious sediments which accumulate from time to time in the system.

All members of the device, as described, numbered and illustrated, may be made of any desirable metal or metals such as are customarily used in the manufacture of like mechanisms.

Having thus set forth my invention, and stated its principal purposes, describing its unique and useful features, and the means of accomplishing my desired ends, what I claim and desire to secure by Letters Patent is:

1. In a water heater, an outer, closed shell housing a heating unit and a combustion chamber, a water column suspended therein, closed at both ends by suitable caps, divided horizontally into two separate water chambers by a partition, a plurality of independent intercommunicating means for connecting the water chambers through divergent tubular passages, disposed in series around and outside thereof, a suitable closure for the top of the combustion chamber with an orifice therein giving vent into a flue disposed on the top thereof for the escape of ascending combustion smoke and gases, a plurality of cold water intake conduits entering the combustion chamber through suitable orifices in the outer shell, connecting with and penetrating the lower water chamber cap, a plurality of hot water discharge pipes extending outwardly through the sidewall of the upper water chamber cap through portholes therein and thence outwardly through suitable orifices in the wall of the outer shell, the discharge and intake pipes being threaded on their outward ends to receive threaded connections, threaded caps to close the ends of certain of the discharge and intake pipes while they may not be in use as water conveyors, the discharge pipes and the intake pipes being adapted to establish means for suspending the water column and its appurtenances within the combustion chamber.

2. In a water heater, an outer shell, housing a heating unit and a combustion chamber, suspended centrally therein a water column threaded at both ends, suitable threaded caps to close the same at either end, horizontally disposed, midway of the column, a water tight partition dividing the same into two separate water chambers, a plurality of outwardly curved U shaped, divergent pipes, disposed in series at different levels around and outside the water column, each fitted at either end respectively into said lower and upper water chambers through holes pierced through the walls thereof, establishing independently communicating passages between the chambers; spiral fins having a central, longitudinal bore therethrough, disposed with a tight sliding fit upon the outer walls of the U shaped pipes; interposed in the respective U shaped pipes, at the lower bends thereof, ninety degree elbow fittings having therein threaded orifices to receive threaded plugs, suitable removable, threaded plugs to close the orifices; a plurality of water supply pipes extending horizontally from without the outer shell therethrough into the lower water chamber, orifices in the respective walls of the outer shell and the lower water chamber suitably disposed to receive said pipes, the said pipes establishing a means of suspension of the water column; a plurality of hot water discharge pipes extending out of the cap of the upper water chamber through the side walls of the cap and of the outer shell through orifices therein suitably disposed therefor and a drain cock interposed in any one of the intake pipes adapted to be opened and to drain the water system of the heater.

3. In a water heater, an outer shell housing and enclosing therein a heating unit and a combustion chamber, two or more openings in the said shell, an equal number of hinged doors shaped in conformity with the contour of the walls of the shell, adapted to close said openings, arranged to swing outwardly, giving access from the outside to the inner members of the heater, suitable lugs attached to or integral with the shell, disposed thereupon to engage door attachments, drilled with holes to receive attaching pins, suitable hinge members attached to or integral with the doors to engage the lugs, drilled with suitable holes to engage the attachment pins, attachment pins to attach the lugs and door hinge members; a water column suspended within the combustion chamber, closed at either end, a partition therein, disposed midway thereof, dividing the column into two separate water chambers; a plurality of independent, tubular channels, fitted at their lower ends into holes suitably disposed therefor, pierced through the walls of the lower chamber, and in like manner, their respective upper ends fitted into corresponding holes therefor, pierced through the walls of the upper chamber, establishing independent means of communication between the chambers; removable, spiral fin members with central, longitudinal bores, mounted upon and in continuous, close contact, throughout the length thereof, with the outer walls of said channels; closable openings in the lower portions of the channels, means for closing the openings; a plurality of intake pipes extending from within the lower water chamber through the walls of the chamber and of the outer shell, through orifices suitably disposed therein, to establish outside connections with water supply sources; a plurality of hot water discharging pipes extending from within the upper chamber cap outwardly through the walls of the said cap and of the outer shell, through orifices suitably disposed therein, to establish connections to conduits leading to hot water service equipment; the outer ends of intake and discharge pipes being threaded to permit of attaching the same to any desired outside connection, suitable threaded caps to close such of said pipes as may not be attached and in use for water conductors and said pipes establishing means of suspension for the water column and its appurtenances within the combustion chamber, substantially as shown.

ULYSSES G. ROGERS.